Patented Jan. 20, 1931

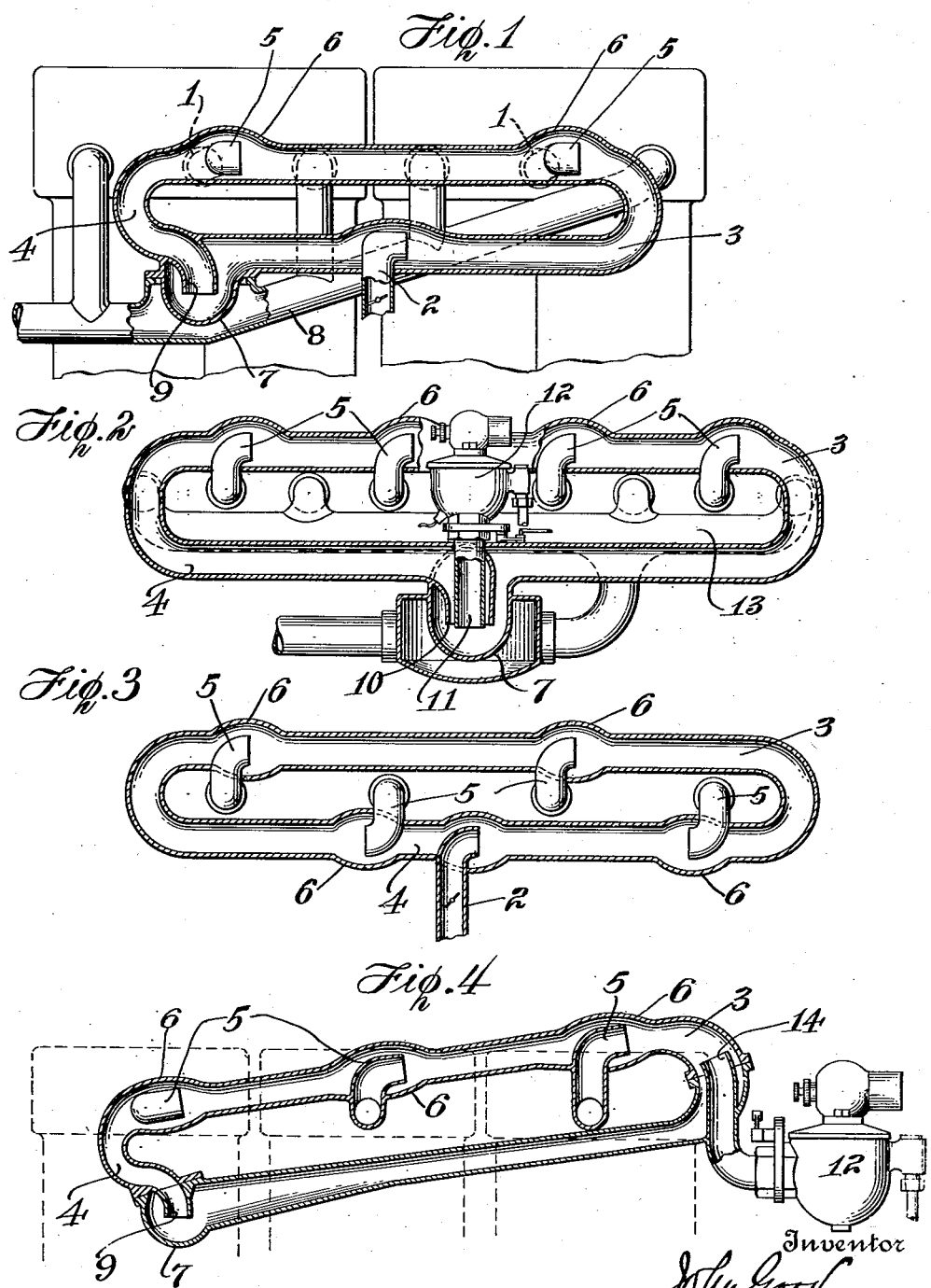

1,789,361

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

ENGINE-VAPORIZING MEANS AND METHOD

Application filed February 28, 1918, Serial No. 219,578. Renewed November 30, 1923.

The invention is an improvement in the means and method for perfecting charge mixtures for combustion engines, particularly those engines which burn the less inflammable liquid fuels. The object is to provide a practical means for separating from the charge mixture, produced by the carburetor, some or all of the fuel therein not in a form suited for explosive combustion and specially or additionally treating such fuel to reduce it to that form before it is allowed to enter the engine. To this end the fuel in the carburetor mixture which exists in the form of liquid, such as that flowing along the wall of the intake conduit, is caused to enter a side or auxiliary conduit and a flow of air or gaseous mixture is maintained in this conduit by which such fuel is conducted and delivered again into the main mixture stream from the carburetor, preferably at a point more remote from the intake ports, heat being applied to it either during its transit through the auxiliary conduit, or afterwards, so that by the time it reaches the intake ports it is better adapted for engine combustion, and the auxiliary conduit being arranged or connected so that the gas flow therethrough is always maintained for all conditions of engine operation and preferably so that it increases when the main flow increases. In its preferred form, the invention involves the use of a loop-form manifold or circulating intake system connected to the engine in such manner as to maintain a continuous circulation of charge mixture therein under the suction effect of the engine directly through the main conduit and reversely through the auxiliary conduit, and also certain special arrangements for minimizing the entrance of raw liquid into the combustion space of the engine and for converting the same into vapor by heat taken from the exhaust gas passage or otherwise.

Each of the four figures of the drawing represents in longitudinal section and more or less diagrammatically, a specific kind of circulating intake system illustrating the principle of the invention in the form last referred to.

The four-cylinder engine outlined in Fig. 1 has two main intake port entrances 1, each of which serves two of the valved intake ports according to common engine design and these entrances are connected to the delivery outlet 2 of a carburetor, or other charge mixture source, by a loop-form intake system common to both of them and composed of two connected limbs or branch conduits marked 3 and 4 respectively. The connection of each port entrance to the system is by means of an elbow member 5 projecting laterally into the manifold part of the system with its open end faced to receive charge mixture coming from the carburetor by way of the branch marked 3.

The outlet 2 of the carburetor is also faced toward the branch conduit 3 so that the velocity effect of the entering mixture produces a region of local pressure depression adjacent the outlet of the conduit 4 into the main conduit 3, on the principle of the injector. This depression, supplemented by the direction of action of the elbows 5, produces a flow through the auxiliary conduit 4. Such flow is substantially continuous in a multi-cylinder engine, and occurs entirely as the result of the energy imparted to the mixture itself without assistance of any external agency; in the present case it results in a circulation of the mixture through the loop formed by the two conduits. That portion of the mixture which does not enter the port entrances 5 flows toward the carburetor through the branch 4 where it joins with the fresh mixture incoming from the carburetor. The several elbows 5 are of less diameter than the manifold pipes at the region of their junction therewith, which relation is preferably created by enlarging the pipe at such junctions as indicated at 6, and their open ends are preferably central in the pipe and spaced away from the sides thereof and especially from the bottom or floor of the intake. In this position the mixture they draw into the engine will be taken from the center of the mixture stream rather than from the walls and will therefore contain only finely divided, suspended or vaporized fuel. That is to say, the unvaporized or insufficiently atomized liquid fuel which naturally tends to flow along the floor or side walls of the intake passage escapes the port entrances and together with that portion of air or gaseous part of the carburetor mixture which also escapes the port entrances, is conducted by the branch 4 toward the main conduit to be eventually vaporized and taken up by the air or mixed as vapor with carburetor mixture in the course of its circulation. Its vaporization is facilitated in this instance by interposing a special vaporizer in the branch 4 as indicated at 7. This vaporizer as shown and preferred consists of a bowl the bottom of which is externally heated as by being encased in the exhaust pipe or a connection therewith marked 8, or otherwise. The excluded liquid fuel and gaseous mixture enter the bowl, centrally, through a spout 9 which is so mounted as to deposit the heavier liquid particles upon the heated bottom of the bowl while permitting the air-borne vapor to pass out of the bowl to the passage 3. Thus the liquid deposited in the bowl receives a maximum heating effect to vaporize it and while it is in film form, while the air and fuel already vaporized are not increased in temperature substantially more than is caused by the mixing with the heat-vaporized liquid from the bowl, which is of course desirable because it means that the charge mixture entering the cylinder is relatively cool and hence contains a minimum weight of fuel and air.

The flow through the auxiliary conduit, being produced by the effect of a pressure difference in the main mixture stream, as above pointed out, is always active whenever any fuel is supplied to the engine, and responds to changes of throttle adjustment in the same sense and practically to the same extent as the main flow in the conduit 3, and is at all times adequate in rate or volume for keeping the excluded liquid in motion through the passage or for absorbing its vapor as produced. On low loads or slow engine speeds, the gas flow through the auxiliary passage is sufficient to keep the excluded liquid fuel moving through it, and at higher speeds or loads, when a greater amount of raw fuel may be excluded from the engine, the auxiliary flow correspondingly increases, or at least does not diminish, so that, as above stated, the excluded fuel is always continuously and promptly carried through to its place of vaporization and junction with the main conduit, by an adequate and relatively liberal portion of air or gaseous medium, and is more or less spread out thereby into film form on the wall of the conduit, including the hot bowl, without accumulating. This action is important to the functioning of the new system, whether heat be applied to the auxiliary passage as in the case of Fig. 1, or whether the excluded liquid fuel is subjected to the vaporizing heat at some other point, as for example as described below in connection with Fig. 2. Inasmuch as both ends of the auxiliary conduit are connected to the main conduit on the same side of the engine throttle, the latter can be situated in its usual place, in or next to the carburetor as indicated in the drawings. In the preferred forms of the invention, as in the form of Fig. 1, the excluded fuel is conducted through the auxiliary conduit 4, for the most part in a downward direction so that the gas flow is assisted by gravity in the performance of its liquid-conveying function. This is desirable, because the movement through the conduit and the vaporization of the raw fuel must be accomplished as rapidly and as continuously as possible in order that there will be no undue lag in the response of the engine to change in the throttle adjustment. Aside from the liquid-conveying function of the flow through the auxiliary conduit, such flow serves the further and very important purpose of providing the presence of air, or of a gaseous medium having the property of taking up and holding fuel vapor in contact with the liquid fuel at the moment of the latter's conversion into vaporous form, and for the purpose of absorbing such vapor as produced. Rapid and efficient vaporization of motor fuels cannot be practicably accomplished except in the presence of a sufficient quantity of gaseous medium to take up and remove the vapor, and this effect is promoted, according to this invention, by giving the auxiliary or return flow passage a cross-sectional area of sufficient size so that it always forms an open gas-flow path incapable of being filled or flooded with the liquid except under most unusual conditions.

By making the intake system so that the usual horizontal manifold forms part of a circulating loop in the manner shown, a liberal portion of air unsaturated with fuel vapor is easily obtained, to flow along with the excluded fuel, and this loop form of manifold or intake system is believed to be the best embodiment of the principle of the invention above described, and those skilled in this art will recognize that the shape and relative sizes of the main and auxiliary conduits and their relation to each other, whereby the necessary gas flow is maintained, and also the means of applying the vaporizing heat, can be extensively varied according to requirements of compactness and other conditions.

Figure 2 embodies the same principles and general arrangement of parts, but in this case the entire mixture from the carburetor is first discharged into the exhaust-heated vaporizer forming part of the main conduit 3, flowing from the bowl of said vaporizer to the port entrances 5, passing which, the gas flow and excluded liquid fuel rejoin the main mixture in the bowl. The spout 10 in this case surrounds the delivery spout 11 of the carburetor 12, concentrically thereto and both discharge centrally toward the bottom of the bowl, but otherwise in the same relation and with the same effect as in Fig. 1. In this case the same heating device, or bowl which serves for heating the direct flow from the carburetor to the engine also serves to re-heat the portion of fuel which, because of its liquid condition, was excluded from entrance to the cylinders. Such fuel and its accompanying gas flow is, in this case, returned for re-passage through the heated part of the main conduit without receiving any particular vaporizing treatment or heat prior to its return, although the spout 10 is within the heated zone of the exhaust gas chamber, and may derive some heat therefrom. This arrangement of the conduits provides a compact organization and allows simple connections with the exhaust line, as will be evident. The bowl is heated in this case by the entire flow of exhaust gas from the exhaust manifold 13.

Figure 3 merely illustrates a variation of the mechanical arrangement of the elbows 5 which in this case are distributed at substantially uniform intervals around the loop, constituting the whole of the loop as the manifold instead of only its upper part. This arrangement is applicable to engines having separate entrances to each intake valve and is intended for use with vaporizer bowls such as above described or any kind of vaporizing means suitable for the purpose, which however are not shown in this figure.

Figure 4 illustrates in effect the same arrangement as in Fig. 1 except that the carburetor spout 14 is in this case disposed at one end of the horizontal loop form system delivering upwardly and toward the elbow connections 5, and the return flow conduit runs downwardly to the vaporizer bowl 7 which is disposed at the lowest point of the loop where liquid will tend to drain into it by gravity, the outlet from the bowl being upwardly inclined toward the carburetor spout 14. The several elbow connections 5 are of successively greater vertical length so that the upper side of the loop may also be inclined and it will be understood that the whole of the loop or merely the vaporizer alone can be subjected to heat from any suitable source for vaporizing purposes, for example as illustrated in Fig. 1. The exclusion of unvaporized or insufficiently atomized liquid fuel from the combustion chambers of the engine minimizes the contamination of the lubricating oil in the crank case as is well known and is particularly necessary during the starting periods when the choking or priming of the carburetor causes considerable unsuspended liquid to be delivered into the intake piping. On such occasions the drain back or down flow features of the forms above described are found particularly useful, and especially in combination with vaporizer bowls of the kind indicated, since any temporary accumulation of liquid (from choking) is quickly evaporated on the arrival of heat from the exhaust gas. There may obviously be any number of vaporizing means provided for the loop, or in the connections of the same with the engine or carburetor and there is no limitation as to the location of the vaporizing means, except that, as above stated, the application of heat to the auxiliary conduit 4, and in the presence of the continuous gas flow therein, serves to vaporize the liquid with the least temperature rise of the charge mixture as a whole.

I claim:

1. An intake system for internal combustion engines comprising a carburetor and a main conduit for conducting a mixture of fuel and air therefrom to the engine, combined with means whereby only air and finely divided or vaporized fuel is admitted to the engine and fuel in liquid form in said mixture is excluded therefrom and vaporized by heat to improve its combustibility, said means including an auxiliary conduit receiving said excluded liquid fuel and connected at both its ends to the main conduit and correlated with the latter to maintain a continuous freely-moving liquid-conveying flow of air or gaseous mixture through it, said excluded liquid fuel being continuously moved and swept along in said auxiliary conduit by the gaseous flow therein, and means for heating said excluded liquid fuel in the presence of gaseous mixture and prior to its entrance to the engine.

2. An intake system for internal combustion engines comprising a carburetor and a main conduit for conducting a mixture of fuel and air therefrom to the engine, combined with means, whereby only air and finely divided or vaporized fuel is admitted to the engine and fuel in liquid form in said mixture is excluded therefrom and vaporized by heat to improve its combustibility, said means including an auxiliary conduit receiving said excluded liquid fuel and also a gaseous part of said mixture, means for causing a freely-moving flow of said gaseous part through the auxiliary conduit variable directly with the flow in main conduit and means for applying exhaust gas heat to said excluded liquid fuel in the presence of gaseous mixture and prior to its entrance to the engine.

3. An intake system for internal combustion engines comprising a carburetor and a main conduit for conducting a mixture of fuel and air therefrom to the engine, combined with means whereby some of the liquid fuel in said mixture is prevented from immediate passage into the engine and vaporized by heat to improve its combustibility, said means including an auxiliary conduit receiving said excluded liquid fuel and a gaseous part of said mixture and conducting them together from their point of exclusion to a junction with said main conduit at a lower level, means for continuously maintaining a flow of said excluded gaseous part through said auxiliary conduit and means for applying heat to the excluded liquid fuel prior to its entrance to the engine.

4. An intake system for internal combustion engines comprising a carburetor and a main conduit for conducting a mixture of liquid fuel and air therefrom to the engine, combined with means whereby fuel in liquid form in said mixture is prevented from immediate entrance to the engine and vaporized by heat, comprising an unobstructed auxiliary conduit receiving said excluded liquid fuel together with a gaseous part of said mixture and having its outlet associated with said main conduit so that the velocity effect of the mixture flow in the latter creates gas flow through said auxiliary conduit, and means for applying heat to and vaporizing said excluded liquid fuel prior to its entrance to the engine.

5. An intake system for internal combustion engines comprising a main conduit conducting a mixture of fuel and air in combustible proportions from a carburetor to the engine, in combination with means for excluding liquid fuel flowing on the wall of said main conduit, together with some of the gaseous part of said mixture, from immediate entrance to the engine, an auxiliary conduit conducting said excluded liquid fuel and excluded gaseous mixture in the presence of each other, downwardly to a point of junction with the main conduit nearer to the carburetor, means whereby the flow velocity in the main conduit causes flow through said auxiliary conduit which increases when the flow through the main conduit increases and means for applying engine exhaust-gas heat to said excluded liquid fuel to vaporize the same in the presence of gaseous mixture prior to its second arrival at the place where it was excluded from the engine.

6. An intake system or internal combustion engines comprising a carburetor and a main conduit for conducting a mixture of fuel and air therefrom to the engine, combined with means successively arranged along said main conduit for permitting entrance to the successive intake ports only of mixture in which the fuel is finely divided or vaporized, and for excluding fuel in liquid form from entrance to the engine, an auxiliary conduit receiving said excluded liquid fuel and a gaseous part of said mixture and arranged to return the same to the main conduit, means whereby the mixture flow from the carburetor maintains a region of reduced pressure adjacent the outlet of said auxiliary conduit adapted to create flow in the latter and means for applying heat to said excluded liquid fuel prior to its entrance to the engine.

7. An intake system for internal combustion engines comprising a carburetor and a main conduit for conducting a mixture of fuel and air therefrom to the engine, combined with means in said conduit for preventing unsuspended liquid fuel in said mixture from passage into the engine and admitting thereto only mixture in which the fuel is finely divided or vaporized, an auxiliary conduit receiving said excluded liquid fuel and a gaseous part of said carburetor mixture and connected at both its ends to the main conduit, means for continuously maintaining a freely-moving gas flow through said auxiliary conduit adequate for keeping the excluded liquid fuel moving therethrough, and means for applying exhaust gas heat to vaporize said liquid in the presence of said gaseous part while moving through said auxiliary conduit.

8. An intake system for internal combustion engines comprising a main conduit conducting a mixture of fuel and air in combustible proportions from a carburetor to the engine, in combination with means for excluding fuel in liquid form and some of the gaseous part of said mixture from immediate entrance to the engine, an auxiliary conduit conducting said excluded liquid fuel and excluded gaseous mixture in the presence of each other to a point of junction with the main conduit, means for applying exhaust-gas heat to said auxiliary conduit to heat said liquid prior to its arrival in said main conduit and means for maintaining the flow through said auxiliary conduit approximately in direct proportion to the rate of flow through said main conduit.

9. An intake system for internal combustion engines comprising a direct flow passage, a carburetor delivering combustible charge mixture to said direct flow passage, a return-flow passage opening from the direct flow passage, means in said direct flow passage whereby only mixture in which the fuel is finely divided or vaporized is admitted to the engine and the rest of the mixture containing fuel in liquid form is delivered into the end of the return flow passage that is nearer the engine; means in the direct flow passage for creating a point of local pressure depression, the outlet of said return flow passage being adjacent said point so that a liquid-moving gas flow is created through said return flow passage into the direct flow passage and means for heating the fuel while passing through said return flow passage.

10. An intake system for internal combustion engines comprising a carburetor and a direct flow conduit for conducting a mixture of fuel and air therefrom to the engine, combined with means whereby only mixture containing fuel in finely divided or vaporized form is admitted to the intake ports and liquid fuel is excluded therefrom, a return flow conduit receiving said excluded liquid fuel and a gaseous part of said mixture at a point near the engine and returning said fuel and gaseous part to the main conduit at a point nearer to the carburetor means, means for imparting exhaust-gas heat to said return flow conduit, and means for maintaining a gas flow therethrough substantially proportional to the flow through the direct flow conduit.

11. An intake system for internal combustion engines comprising a carburetor, a direct flow conduit for conducting a mixture of fuel and air therefrom to the engine and a throttle, combined with means whereby liquid fuel in said mixture is excluded from immediate passage into the engine, a return flow conduit receiving said excluded liquid fuel and also a gaseous part of said mixture on the engine side of the throttle and returning said fuel and gaseous part to the main conduit at a point nearer to the carburetor and on the same side of the throttle, means for heating said liquid fuel in the presence of said gaseous part in the return conduit, and means whereby the velocity effect of said direct flow causes continuous gas flow from the return passage into the direct flow passage.

12. An intake system for internal combustion engines comprising a carburetor, a direct flow conduit for conducting a mixture of liquid fuel and air therefrom to the engine, means for heating part of said conduit, and a throttle between the carburetor and the engine combined with means for excluding fuel in liquid form from the engine, a return flow conduit having both its ends connected with the direct flow conduit on the engine side of said throttle and receiving said excluded liquid fuel and a gaseous part of said mixture and conducting the same to said direct flow conduit for repassage through the heated part thereof and means in the latter conduit adapted to maintain a gas flow in said return conduit and a continuous delivery of air and fuel into the main conduit.

13. An intake system for internal combustion engines comprising a carburetor, a main conduit and manifold having a plurality of intake port connections projecting into the manifold passage with their openings within the manifold, all of said openings being spaced away from the sides of the manifold and arranged transversely of the manifold passage whereby unsuspended liquid fuel is excluded from the engine and means for causing a flow of said fuel through an auxiliary conduit back to said main conduit and means for heating said excluded fuel prior to its second arrival at said port connections.

14. An intake system for internal combustion engines comprising a carburetor and main and auxiliary conduits constituting a loop, port connections extending into the loop and having entrances so located therein that liquid fuel flowing on the wall of the loop passage passes such entrances without entering, a heated vaporizer for such liquid fuel included in the loop and means for maintaining a gas flow through the loop.

15. An intake system for internal combustion engines comprising a carburetor, a main intake conduit, means whereby liquid fuel in the mixture therein is prevented from immediate passage into the engine, an auxiliary conduit receiving said liquid fuel and a gaseous part of said mixture, and conducting the same to a point of junction with said main conduit, a bowl type vaporizer forming part of said auxiliary conduit, and means for causing gas flow through said auxiliary conduit and vaporizer.

In testimony whereof I have signed this specification.

JOHN GOOD.